United States Patent
Krishnamurthy et al.

(10) Patent No.: US 11,689,467 B2
(45) Date of Patent: Jun. 27, 2023

(54) QOS POLICY PROVISIONING ON RESOURCE CONSTRAINED NETWORK DEVICES

(71) Applicant: Cisco Technology, Inc., San Jose, CA (US)

(72) Inventors: Anand Krishnamurthy, San Jose, CA (US); Kiran K. Yedavalli, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 255 days.

(21) Appl. No.: 16/987,777

(22) Filed: Aug. 7, 2020

(65) Prior Publication Data
US 2022/0045958 A1 Feb. 10, 2022

(51) Int. Cl.
*H04L 47/24* (2022.01)
*H04L 43/0876* (2022.01)

(52) U.S. Cl.
CPC .......... *H04L 47/24* (2013.01); *H04L 43/0876* (2013.01)

(58) Field of Classification Search
CPC ............... H04L 41/046; H04L 41/0806; H04L 41/0893; H04L 43/0876; H04L 47/24; H04L 47/2441; H04L 47/41; H04L 45/74591
See application file for complete search history.

(56) References Cited

U.S. PATENT DOCUMENTS

| | | | | |
|---|---|---|---|---|
| 9,899,088 B1* | 2/2018 | Jiang | ..................... | G06F 3/0626 |
| 2010/0195503 A1* | 8/2010 | Raleigh | ............. | H04W 28/0268 370/235 |
| 2012/0096220 A1* | 4/2012 | Liu | ......................... | H04L 69/22 711/108 |
| 2015/0229565 A1* | 8/2015 | Ravipati | ........... | H04L 45/74591 711/108 |
| 2017/0118041 A1* | 4/2017 | Bhattacharya | ...... | H04L 41/5054 |
| 2017/0195253 A1* | 7/2017 | Annaluru | ................ | H04L 41/40 |
| 2017/0317874 A1* | 11/2017 | Borah | ................. | H04L 41/5009 |
| 2017/0346765 A1* | 11/2017 | Immidi | ................ | H04L 45/302 |
| 2018/0165117 A1* | 6/2018 | Reumann | ............ | G06F 9/45558 |
| 2018/0367387 A1* | 12/2018 | Kompella | ........... | H04L 41/0893 |

(Continued)

OTHER PUBLICATIONS

Cisco DNA Center User Guide, Release 1.3.1.0, "Application Policies," Updated Jun. 24, 2020, 50 pages.

(Continued)

*Primary Examiner* — Douglas B Blair
(74) *Attorney, Agent, or Firm* — Patterson + Sherdan, LLP (57) ABSTRACT

Embodiments herein describe techniques for prioritizing applications based on application usage data. The space in the TCAM in many network devices is limited. That is, there may be more applications (and corresponding QoS settings) than there is space in the TCAM. In the embodiments herein, a netflow collector monitors the traffic flows in the network devices. A application usage tracker can identify which applications generate traffic in which network devices. That is, the application usage tracker can identify, based on the information provided by the netflow collector, the application usage of each network device. The central management tool can prune the applications that are not used by the network device and generate QoS settings only for applications that are used by the network device.

20 Claims, 5 Drawing Sheets

(56) References Cited

U.S. PATENT DOCUMENTS

2018/0367396 A1* 12/2018 Kompella ............. H04L 63/101
2018/0367413 A1* 12/2018 Kompella ............... H04L 41/14
2020/0252291 A1* 8/2020 Mittal ................. H04L 41/0894
2021/0067448 A1* 3/2021 Remen .............. H04L 45/74591

OTHER PUBLICATIONS

Cisco DNA Center User Guide, Release 1.3.1.0, "Processing Order for Devices with Limited Resources" Updated Jun. 24, 2020, 50 pages.
Cisco DNA Center User Guide, Release 1.3.1.0, "Queuing Profiles" Updated Jun. 24, 2020, 50 pages.
IP Applicaton Services, "NetFlow Version 9 Flow-Record Format," Last Updated May 2011, 12 pages.
Cisco SD-AVC User Guide, Release 3.0.0 "SD-AVC Overview," Updated Dec. 16, 2019, 8 pages.
Cisco DNA Center User Guide, Release 1.3.1.0, "Configure Policies" Updated Jun. 24, 2020, 50 pages.
AAPA, "Efficient Policy Provisioning on Resource Constrained Network Devices," 2 Pages.
AAPA, "Application Choice Algorithm in a Policy," 1 page.

* cited by examiner

QOS POLICY PROVISIONING ON RESOURCE CONSTRAINED NETWORK DEVICES

TECHNICAL FIELD

Embodiments presented in this disclosure generally relate to setting and adjusting QoS policies in response to application usage data.

BACKGROUND

Network administrators can use a centralized management tool to set Quality of Service (QoS) in a network using application policies. The applications are the software programs or network signaling protocols that are being used in the network. The centralized management tool can provide QoS support for a set of applications included in a library (e.g., Cisco Next Generation Network-Based Application Recognition (NBAR2) library which includes approximately 1400 distinct applications). The applications are grouped into logical groups called application sets which can, in turn, be assigned a business relevance within a policy. If there are additional applications that are not included in the library, these applications are added as custom applications and assigned to one of the application sets.

The centralized management tool generates access control lists (ACLs) and access control entries (ACEs) for managing QoS policies corresponding to the application sets. These ACLs and ACEs are then configured in the network devices so the network devices can manage traffic flow to satisfy these QoS policies. For example, the QoS policies may prioritize the traffic flow for one application above another. Often, the network devices load entries corresponding to the ACLs and ACEs into a ternary content-addressable memory (TCAM) for high-speed access to this information.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method that includes monitoring application traffic in a plurality of network devices, receiving a plurality of Quality of Service (QoS) policies, each corresponding to one of the plurality of network devices, identifying, based on the application traffic, which ones of a plurality of applications generated a respective traffic flow on each of the plurality of network devices during a predefined time period, removing from each of the QoS policies any of the plurality of applications that did not generate a respective traffic flow on the corresponding one of the plurality of network devices during the predefined time period, and generating QoS settings to be stored in memory of the plurality of network devices based on the QoS policies.

Another embodiment described herein is a non-transitory computer readable medium having program instructions embodied therewith, the program instructions executable by a processor to perform an operation, the operation includes monitoring application traffic in a plurality of network devices, receiving a plurality of QoS policies, each corresponding to one of the plurality of network devices, identifying, based on the application traffic, which ones of a plurality of applications generated a respective traffic flow on each of the plurality of network devices during a predefined time period, removing from each of the QoS policies any of the plurality of applications that did not generate a respective traffic flow on the corresponding one of the plurality of network devices during the predefined time period, and generating QoS settings to be stored in memory of the plurality of network devices based on the QoS policies.

Another embodiment described herein is a system that includes a processor and a memory where the memory includes an application, which when executed by the processor, performs an operation, the operation includes monitoring application traffic in a plurality of network devices, receiving a plurality of QoS policies, each corresponding to one of the plurality of network devices, identifying, based on the application traffic, which ones of a plurality of applications generated a respective traffic flow on each of the plurality of network devices during a predefined time period, removing from each of the QoS policies any of the plurality of applications that did not generate a respective traffic flow on the corresponding one of the plurality of network devices during the predefined time period, and generating QoS settings to be stored in memory of the plurality of network devices based on the QoS policies.

Example Embodiments

Embodiments herein describe techniques for prioritizing applications based on application usage data. The space in the TCAM in many network devices is limited. That is, there may be more applications (and corresponding ACL and ACEs) than there is space in the TCAM. Thus, a centralized management tool may prioritize the applications to determine which have ACL/ACEs stored in the TCAM for a particular network device. Thus, only the ACL/ACEs (which can be referring to as QoS settings) for the higher priority applications are stored in the TCAM for that network device.

In the embodiments herein, a netflow collector monitors the traffic flows in the network devices. An application usage tracker can identify which applications generate traffic in which network devices. That is, the application usage tracker can identify, based on the information provided by the netflow collector, the application usage of each network device. In one embodiment, the centralized management tool can use this information to prune the applications. For example, the central management tool can prioritize the applications, but before generating the ACL/ACEs for the network devices to perform QoS, determine for each network device which applications generate network traffic on the device and which do not. The central management tool can prune the applications that are not used by the network device and generate ACL/ACEs (e.g., QoS settings) only for applications that are used by the network device. In this manner, the central management tool can provide customized ACL/ACE data that more efficiently uses the limited space in the TCAMs of the network devices.

Figure 1:
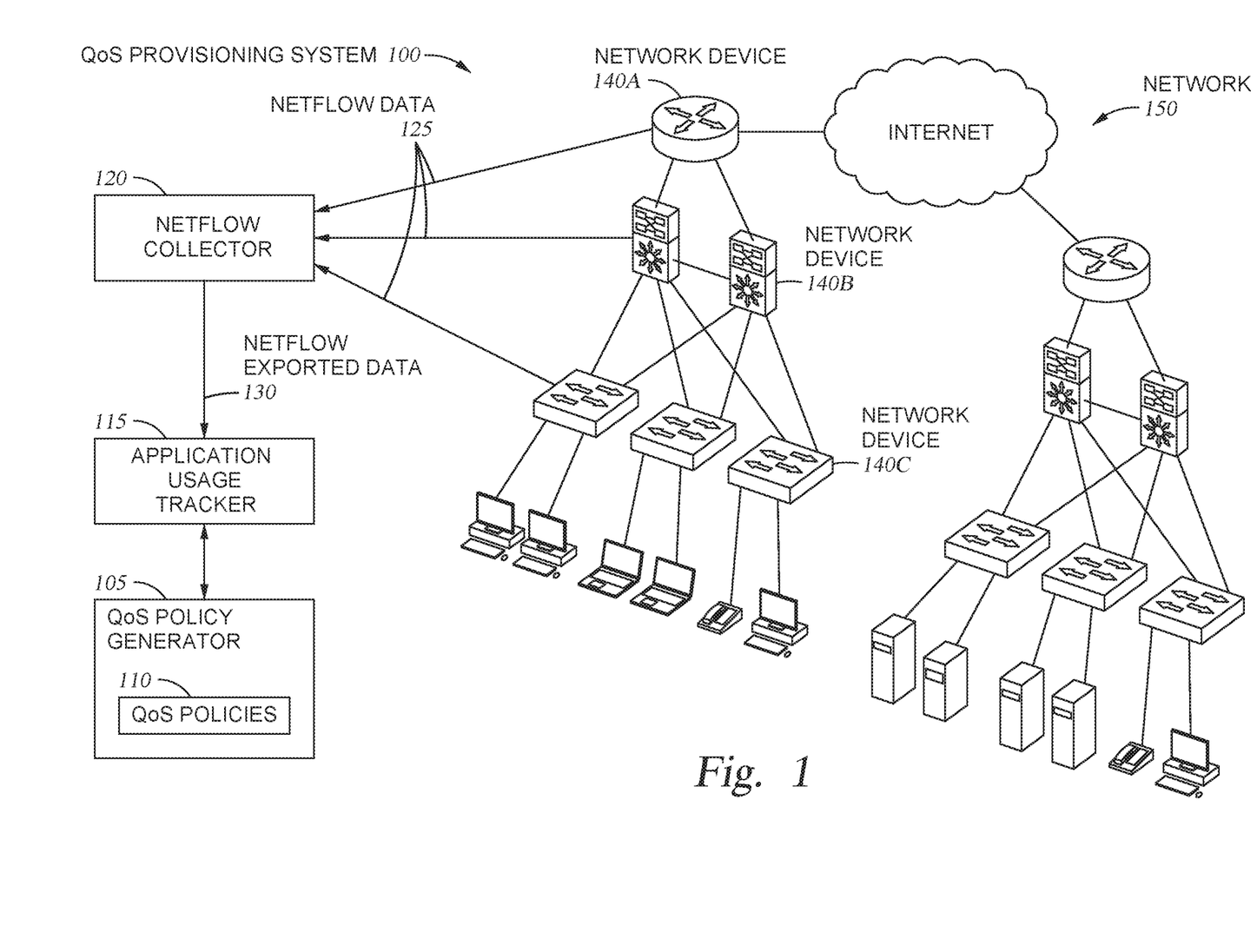
FIG. 1 illustrates a QoS provisioning system, according to one embodiment.

FIG. 1 illustrates a QoS provisioning system 100, according to one embodiment. The provisioning system 100 includes a QoS policy generator 105, an application usage tracker 115, a netflow collector 120, and a network 150. The QoS policy generator may be a software application (or a collection of software applications) that generate QoS policies 110 for establishing QoS in the network 150. In one embodiment, the QoS policy generator 105 generates a QoS policy 110 for each of the network devices 140. The QoS policies 110 determine how the network devices 140 treat traffic flows generated by different applications. The QoS policy generator 105 can generate ACLs and ACEs using the QoS policies 110 which are loaded into TCAMs in network devices 140 in the network 150. The ACLs and ACEs are QoS settings or instructions for the network devices to manage the traffic flows generated by the corresponding applications. If a traffic flow for an application does not match one of the ACLs or ACEs in the TCAM, the traffic flow is sent to a best effort queue within the network device 140.

In one embodiment, the netflow collector 120 is a software application that monitors the traffic flows in the network devices 140. That is, the netflow collector 120 receives netflow data 125 from the network devices 140A-C which describes the types of traffic flows in the network devices 140 and provides information for identifying the applications that generated those flows. Although FIG. 1 illustrates the netflow collector 120 retrieving information from three network devices 140A-C, the netflow collector 120 can be connected to any number of the network devices in the network 150 (e.g., a subset of the network devices or all the network devices in the network 150). The netflow collector 120 identifies the various traffic flows in the individual network devices 140 and exports the netflow data to the application usage tracker.

In one embodiment, the application usage tracker 115 is a software application that identifies the applications and generates usage metrics for each network device 140 using netflow exported data 130 provided by the netflow collector 120. For example, the application usage tracker 115 may identify, for a predefined time period (e.g., a day, half a day, two hours), which applications generated traffic that flowed through each network device using the netflow exported data 130 such as the TCP/UDP ports and the fields in the netflow messages for the traffic flows. After a time period expires, the application usage tracker 115 may reset the usage metrics for the network devices 140 so that usage information can be collected for the next time period.

The network 150 includes the network devices 140 that provide connectivity between user devices and the Internet. For example, the network devices 140 may be part of an enterprise fabric, such as a company's or organization's private network. The network devices 140 can include switches, routers, and the like. As discussed in more detail below, the QoS policy generator 105 uses the QoS policies 110 specified by the network administrator and the metrics maintained by the application usage tracker 115 to generate customized ACLs/ACEs which are stored in the TCAMs of the network devices 140. These customized ACLs/ACEs ensure the network devices 140 provide the desired QoS for application traffic flowing through the network devices 140.

One network device 140 may have different application traffic flows than another network device 140 in the network 150. For example, one network device 140 may be coupled to an user device (e.g., desktop or laptop) used by a salesperson while another network device 140 may be coupled to an user device used by a design engineer. The type of applications accessed by a salesperson and the engineer, and thus, the type of application traffic flows transmitted through the network devices 140 can vary. Thus, storing ACLs/ACEs in the TCAM of the network device used by the salesperson that govern QoS for applications typically used by the engineer and storing ACLs/ACEs in the TCAM of the network device used by the engineer that govern QoS for applications typically used by the salesperson may be an inefficient use of the limited TCAM space. Thus, considering the netflow data 125 for each network device 140 when setting the ACLs/ACEs for that network device 140 may result in improved performance since the TCAM can be populated with ACLs/ACEs corresponding to applications that are known to generate traffic flowing through the network device 140.

Figure 2:
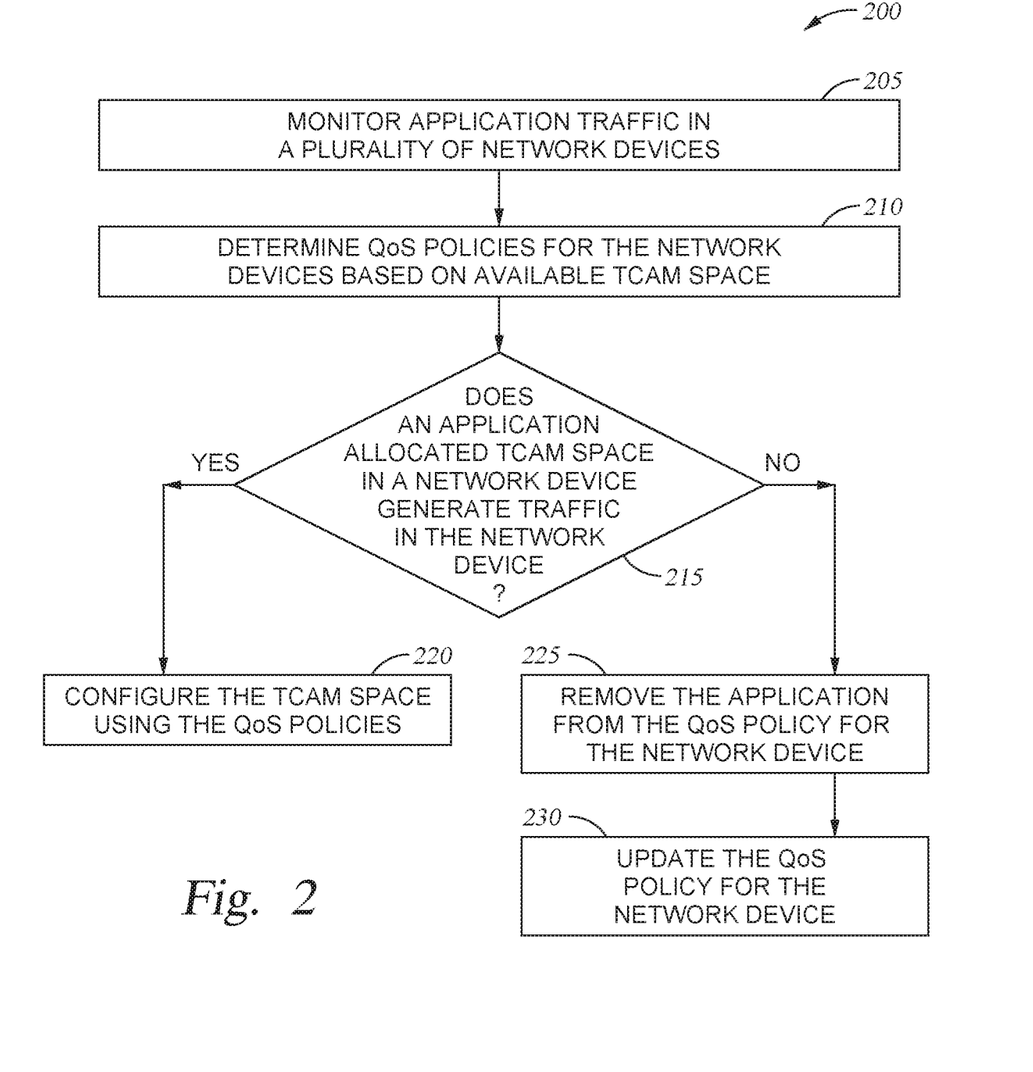
FIG. 2 is a flowchart for managing entries in TCAM for a QoS policy based on application usage data, according to one embodiment.

FIG. 2 is a flowchart of a method 200 for managing entries in TCAM for a QoS policy based on application usage data, according to one embodiment. At block 205, the netflow collector monitors application traffic in a plurality of network devices. For example, these network devices may be part of an enterprise fabric or multiple fabrics. The netflow collector may be part of a centralized management tool that monitors the network devices to make automatic adjustments to the devices or to provide reports and statistics to a network administrator. In one embodiment, the netflow collector receives netflow data which identifies different types of traffic flows in the network devices and sends the netflow data to the application usage tracker which identifies the applications generating those traffic flows.

At block 210, a QoS policy generator determines QoS policies for the network devices based on available TCAM space. In one embodiment, the QoS policy generator use a static prioritization algorithm to prioritize (e.g., rank) the applications corresponding to the QoS policies. For example, applications with a higher priority are more likely to have corresponding entries in the TCAMs of the network devices while applications with lower priorities are less likely to be allocated space in the TCAMs for their QoS policies.

The embodiments herein are not limited to any particular prioritization algorithm. For example, the algorithm can consider such information as user assigned importance (whether an application is business relevant or irrelevant to the user), global popularity (i.e., how much of the traffic flowing in global networks is attributable to the different applications), the type of traffic class assigned to the application, and the like. The details of one suitable static prioritization algorithm is described in FIG. 5 below.

Once the applications are prioritized, at block 215, the QoS policy generator determines whether an application allocated TCAM space in each of the network device for its QoS settings generates traffic in the network device. That is, for each network device, the QoS policy generator determines whether the prioritized applications are actually used by the network device (or the user devices connected to that network device). To do so, the QoS policy generator can rely on the usage metrics collected by the application usage tracker. For example, the QoS policy generator can query the application usage tracker to determine which of the prioritized applications were used by each of the network devices.

The QoS policy generator may prune an application assigned a high priority at block 210 from the QoS policy based on the usage data. For example, a scavenger or business irrelevant application that is used in the switch may be prioritized over a business relevant application if that application is unused in the network device. That way, the TCAM includes an entry for performing QoS for the scavenger or business irrelevant application. This TCAM entry may indicate that the traffic for the scavenger or business irrelevant application should be treated with a lower priority in the network switch. Thus, while the scavenger or business irrelevant application may treated as lower priority traffic in the switch, it is more important to include this application in the QoS policy (so it is assigned a TCAM entry) than a higher priority application that does not generate traffic in the switch.

In one embodiment, determining whether an application was used on a network device is based on a predefined time window—e.g., if the netflow collector identified a traffic flow generated by the application in the last 24 hours. In another embodiment, determining whether an application was used on a network device is also based on a threshold amount or size of the traffic flow. For example, if the traffic flow did not account for at least 1% of the total traffic flowing through network device during a 24 hour period, the application usage tracker indicates that the application was not used by the network device during that time period.

While block 215 may be performed for each application, there may be some applications that the network administrator has marked as being very important which may be excluded. In that case, the method 200 may not consider the usage of those applications but instead always include TCAM entries dedicated to the QoS settings of those applications.

If the QoS policy generator learns from the application usage tracker that the applications allocated TCAM space are used by the network device, the method 200 proceeds to block 220 where the QoS policy generator configures the QoS policy for the network device which uses the TCAM space for the network device. That is, the QoS policy generator does not change the QoS policy generated at block 210. In one embodiment, the QoS policy generator populates ACLs/ACEs that configure the network device to perform the desired QoS for the applications. The QoS policy generator then transmits these ACLs/ACEs as updates to the network devices.

However, if the QoS policy generator identifies at least one application that was allocated space in the TCAM at block 210 but is not actually used in the network device, the method 200 instead proceeds to block 225 where the QoS policy generator removes the application from the QoS policy for the network device. For example, the application may have been assigned a high priority by static prioritization algorithm (which does not consider actual usage), and thus, the QoS policy generator may have decided to allocate TCAM space for QoS settings of that application. However, the QoS policy generator can query the application usage tracker to determine that the application was (or is) not used by that particular network device. In response, the QoS policy generator can remove the application from the QoS policy for the network device. Stated differently, the QoS policy no longer allocates TCAM space for managing the QoS of the network traffic generated by the pruned application.

At block 230, the QoS policy generator updates the QoS policy for the network device. For example, as a result of removing the unused application at block 225, a lower priority application which may not have been allocated TCAM space at block 210 but is generating traffic flow on the network device can instead be allocated the TCAM space freed up by removing (or pruning) the application that was not used. In this manner, the QoS policy generator can leverage actual usage data for an individual network device to decide which applications (and their corresponding QoS settings) are allocated the limited TCAM space in a network device.

For example, the same application prioritization performed at block 210 may be used to establish QoS policies for all the network devices in a network (e.g., the network 150 in FIG. 1). However, because the applications that generate traffic flows in a particular network device can differ, the method 200 can customize the QoS policies such that different network devices have different ACLs/ACEs (i.e., different QoS settings) in their TCAMs. Thus, without considering the metric collected by the application usage tracker, multiple network devices may be configured with the same QoS policy even though these network devices may have different traffic flows. As a result, the TCAMs might store QoS settings corresponding to applications that never generate traffic flows on the network devices.

Figure 3:
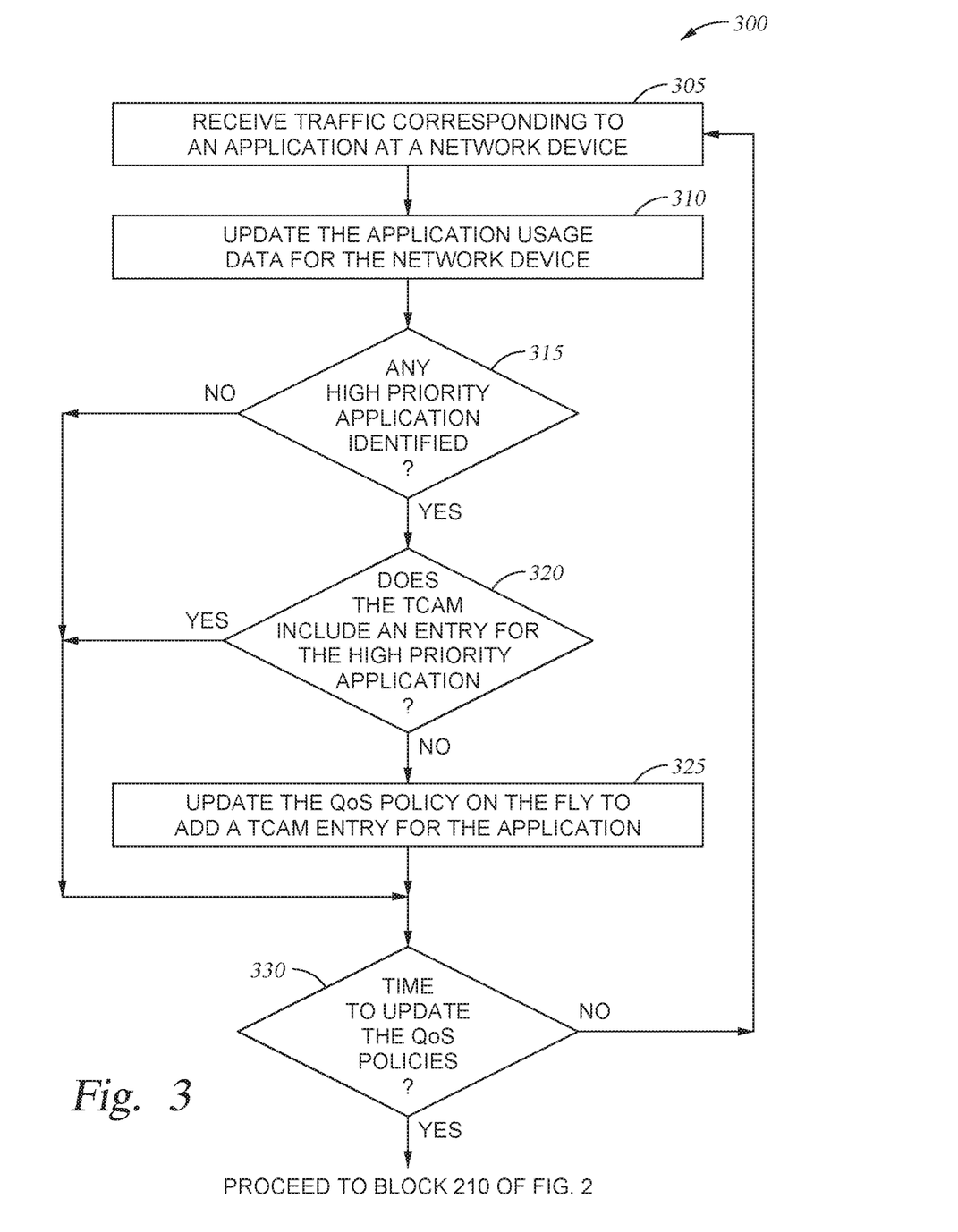
FIG. 3 is a flowchart for updating TCAM entries in response to application usage changes, according to one embodiment.

FIG. 3 is a flowchart of a method 300 for updating TCAM entries in response to application usage changes, according to one embodiment. In one embodiment, the method 300 is performed after the QoS policies for the network devices have been implemented as described in the method 200 in FIG. 2. The method 300 can be used to change or update the QoS policies as described below.

At block 305, a network device receives traffic corresponding to an application (e.g., application traffic).

At block 310 the netflow collector and the application usage tracker update the application usage data for the network device to indicate which applications generated application traffic that flowed through the network device during the relevant time period. For example, the application usage tracker may have reset the usage metrics from the previous time period, and thus, each application must again generate a traffic flow in the network device for the application to be considered as being used by the network device for the current time period. As such, as traffic flows through the network devices, the netflow collector can continue to collect netflow data and export that data to the application usage tracker to update the usage metrics.

At block 315 the QoS policy generator determines whether any of the applications identified at block 310 are high priority applications. For example, some applications may be designated as high priority applications (which may be separate from, or part of, the prioritization performed at block 210 in the method 200). In one embodiment, the network administrator may provide a list of high priority applications to the QoS policy generator. In another embodiment, the high priority applications may be a particular type of application such as a user customized application. In any case, using the collected netflow data, the QoS policy generator can in real time determine whether a high priority application has generated a traffic flow on each of the network devices being monitored.

If a traffic flow for a high priority application is identified on at least one network device, the method 300 proceeds to block 320 where the QoS policy generator determines whether the TCAM for that network device includes an entry for the application. That is, the QoS policy generator determines whether the TCAM for the network device includes QoS settings (e.g., an ACL or ACE) in an entry that matches the application. As mentioned above, the TCAM space is limited and thus may not include QoS settings for all applications that might generate a traffic flow through the network device.

If the QoS policy generator determines the network device does have QoS settings in its TCAM entry for managing the traffic flow of the application, the method 300 proceeds to block 330.

However, if the QoS policy generator determines the network device does not have a TCAM entry corresponding to the application, the method 300 instead proceeds to block 325 where the QoS policy generator updates the QoS policy on the fly to add a TCAM entry for QoS settings for the high priority application. In one embodiment, the QoS policy generator updates the QoS policies for the network devices on a fixed schedule (e.g., every day or every three days), but when a high priority application generates a traffic flow on a network device that does not have a TCAM entry for that application, the QoS policy generator can immediately update the QoS policy so that TCAM space is allocated for QoS settings for that application. Thus, the network device does not have to wait until the next scheduled time when the QoS policy generator updates the QoS policies for all the network devices. For example, the high priority applications may be part of a service level agreement (SLA) where QoS control for high priority applications is guaranteed. Thus, the QoS policy generator can identify a network device that has traffic flow for a high priority application but no corresponding TCAM entries and the QoS policy generator can immediately remedy the situation. For example, the QoS policy generator can swap TCAM entries assigned to a lower priority application (e.g., using the priorities set at block 210 of the method 200) to the high priority application. In this manner, the QoS policy generator can calculate the final effective policies for the network devices, configure each of the network devices with those policies, and continue to update the network devices.

Further, if the QoS policy generator determines one of the network devices has traffic flows for multiple high priority applications that do not have corresponding entries in the TCAM, the QoS policy can update the TCAM in a batch rather than separate QoS policy updates.

At block 330, the QoS policy generator determines whether it is time to update the QoS policies for the network device. For example, the QoS policy generator may update the QoS policies daily or weekly which is tunable by the network administrator. Alternatively, the QoS policy generator may update the QoS policies when criteria used to prioritize the application at block 210 of the method 200 is updated (e.g., when the global popularity of the applications is updated or when the user has added new customized applications).

If QoS policy generator decides to update the QoS policies, the method 300 proceeds to block 210 of the method 200 where the applications can be re-prioritized using the updated application usage data gathered at block 315. However, if the prioritization criteria has not been updated since last time the QoS policies have been updated, the method 300 may instead proceed to block 215 where the updated usage metrics derived from performing the method 300 are used to prune the applications from the QoS policies. In this manner, the TCAM space allocations can change as applications that previously generated traffic in a network device, no longer do, or as application that previously did not generate traffic in the network device, now generate traffic flows.

However, if the QoS policy generator determines it is not yet time to update the QoS policies, the method 300 returns to 305 where the netflow collector continues to receive netflow data from the network devices and sends this data to the application usage tracker which updates the usage metrics.

Figure 4:
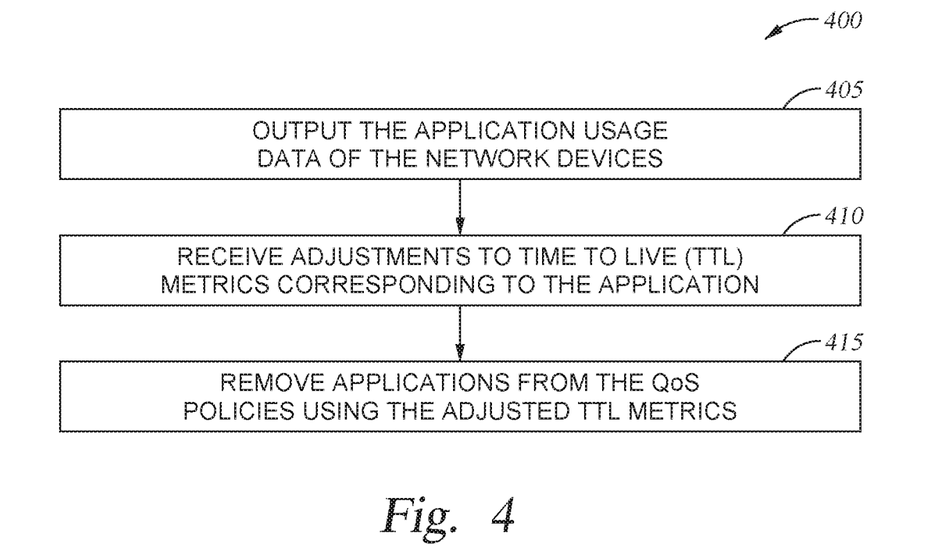
FIG. 4 is a flowchart for adjusting time to live metrics of the applications, according to one embodiment.

FIG. 4 is a flowchart of a method 400 for adjusting time to live (TTL) metrics of the applications, according to one embodiment. TTL metrics indicate the length of time that applications that were previously used to generate a traffic flow in a network device are considered as still being used by the network device. As described above, in one embodiment, the application usage tracker can reset the usage metrics each time the QoS policy generator updates the QoS policies. However, an application may have a TTL metric that forces the application usage tracker to continue to assert the application is being used by the network device after the QoS policies have been updated. For example, assume the QoS policy generator updates the QoS policies daily and the application usage tracker resets the usage metrics daily. However, some applications (e.g., high priority applications) may be assigned a TTL metric that is longer than a day—e.g., two days. In that scenario, the application usage tracker may detect traffic corresponding to Application A on Network Device A in the evening of Day 1. Even if the application usage tracker does not detect any traffic corresponding to Application A on the Network Device A on Day 2, the application usage tracker still indicates in the usage metrics that the Application A was used by the Network Device A on Day 2. Thus, when updating the QoS policies in the morning of Day 3, the QoS policy generator would not prune Application A. However, once the TTL metric expires on Day 3 and the application usage tracker still does not detect traffic corresponding to Application A on Network Device A during Day 3, the QoS policy generator prunes Application A from the QoS policy for Network Device A when updating the QoS policies on the morning of Day 4. Thus, the TTL metric is way for a network administrator to artificially inflate the time an application is considered as being used by a network device so that high priority applications are not constantly being added or removed when they are used sporadically by a network device.

At block 405, the application usage tracker outputs for display the application usage data of the network devices. The usage data may indicate how often applications are added and removed from the QoS policies of the network devices. In addition, the usage data may indicate the application usage over time. The network administrator can then view this information and determine whether high priority applications are being added and removed too frequently from the QoS policies.

At block 410, the application usage tracker receives adjustments to TTL metrics corresponding to one or more of the applications. For example, the network administrator may have identified one or more of the applications that are frequently being removed from the QoS policy based on the usage data that she believes is a high priority application.

The network administrator can extend the TTL metrics for these applications so that it less likely these applications are pruned from the QoS policies at block 215 and 220 of the method 200.

At block 415, the QoS policy generator removes or prunes applications from the QoS policies using the adjusted TTL metrics. For example, when determining whether an application is used during a predefined time period, the application usage tracker can consider both actual usage as learned by the netflow collector as well as the adjusted TTL metrics. Thus, an application can be deemed as being used on a network device for a current time period when the application generates traffic on the network device during that time period or when a TTL metric for the application has not yet expired.

Figure 5:
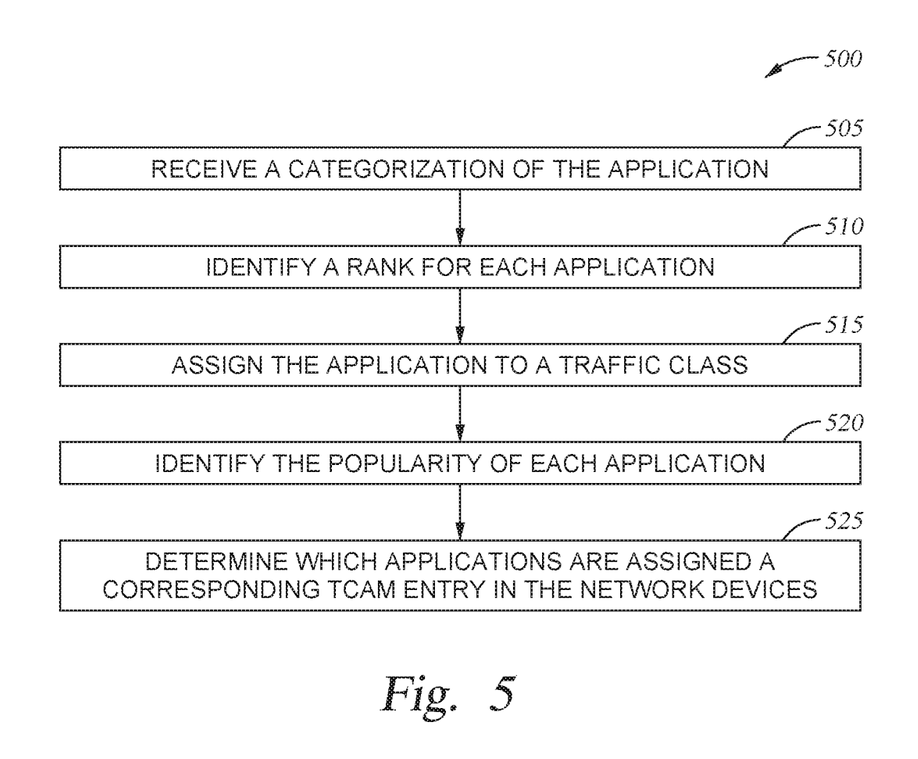
FIG. 5 is a flowchart for assigning a priority to the applications, according to one embodiment.

FIG. 5 is a flowchart of a method 500 for assigning a priority to the applications, according to one embodiment. For example, the method 500 may be used at block 210 of method 200 as a prioritization algorithm to prioritize the applications before the applications are pruned in response to usage data (or the TTL metric). However, method 500 is just one suitable example of a prioritization algorithm.

At block 505, the QoS policy generator receives a categorization of the applications. In one embodiment, the categorizations indicate the source of the application, i.e., whether the application was part of a default or standard list of applications (e.g., a subset of the applications listed in a library, such as the NBAR2 library) or generated by a customer. In addition to the source of the application, the categorizations can indicate how the application should be treated in the network. For example, the categorizations may indicate if the application is business relevant, business irrelevant, or a default categorization. Each categorization may correspond to a different weight which affects how the application is prioritized, or the categorization may affect the different factors listed below.

At block 510, the QoS policy generator identifies a rank for each application. In one embodiment, the rank is determined by the categorization assigned at block 505. Alternatively, the rank may be determined based on different user input. For example, a customized application may be assigned the highest rank. Favorited applications in a predefined library (e.g., NBAR2 library) may receive a lower rank than the customized applications, while non-favorited applications in the library may receive the lowest rank (or do not receive any rank).

At block 515, the QoS policy generator assigns the applications to a traffic class. The applications may be assigned initial traffic classes by the NBAR2 library or by the customer if the application is a custom application. Example traffic classes include Signaling, Bulk Data, Network Control, Operations Administration Management (Ops Admin Mgmt), Transactional Data, Scavenger, Multimedia Streaming, Multimedia Conferencing, Real Time Interactive, Broadcast Video, VoIP Telephony, and Best Effort. Based on the QoS policy intent from the customer, the QoS policy generator assigns the final traffic class to the applications. That is, the QoS policy generator may change the applications to a different traffic class relative to the initially assigned traffic classes, or may leave the traffic class unchanged. For example, if the application is business relevant, the initial traffic class assigned by the NBAR2 library or the customer is used as the final traffic class. However, if the application is in the default categorization, the QoS policy generator changes the traffic class to Best Effort (if not already assigned to that traffic class). If the application is business irrelevant, the QoS policy generator changes the traffic class to Scavenger (if not already assigned to that traffic class). Each traffic class (or different groups of traffic classes) may have the same weight or different scores or weights.

At block 520, the QoS policy generator identifies a popularity of each application. In one embodiment, the popularity is based on a global or regional popularity of the application. For example, a networking organization or a service provider can publish popularity ranking of the applications (e.g., the amount of overall traffic generated by each application). While the popularity can be based on application usage data, unlike the usage metrics described above, the popularity metric does not inform the QoS policy generator whether a particular application generated traffic on a particular network device, and thus, does not solve the problem with allocating limited TCAM space to applications that may or may not be used on the network device.

At block 525, the QoS policy generator determines, based on the information gathered in blocks 505-520, which applications are assigned TCAM space in the network devices.

In one embodiment, the QoS policy generator first assigns ACLs assigned to custom applications entries in the TCAM. For example, if a TCAM for a network device includes 400 entries, and custom applications consume 30 entries in the TCAM (each application can be represented by one or more ACEs based on the application definition, where each ACE consumes one TCAM entry). The QoS policy generator then assigns TCAM entries to the favorited applications in a library (e.g., favorited NBAR applications) which may consume 40 TCAM entries. Any remaining TCAM entries are divided among the traffic classes. For example, if there are 330 entries remaining and 11 traffic class, each traffic class is assigned 30 entries in the TCAM. In each traffic class, the applications are assigned TCAM entries based on popularity and lexicographic order (if there is a tie in popularity). The QoS policy generator can repeat this for each network device in order to provide an initial assignment of QoS settings defining a QoS policy for the network devices.

After method 500 completes, the method returns to method 200 where the application usage data per network device is then considered in order to adjust the QoS settings generated using the method 500 as discussed above.

Figure 6:
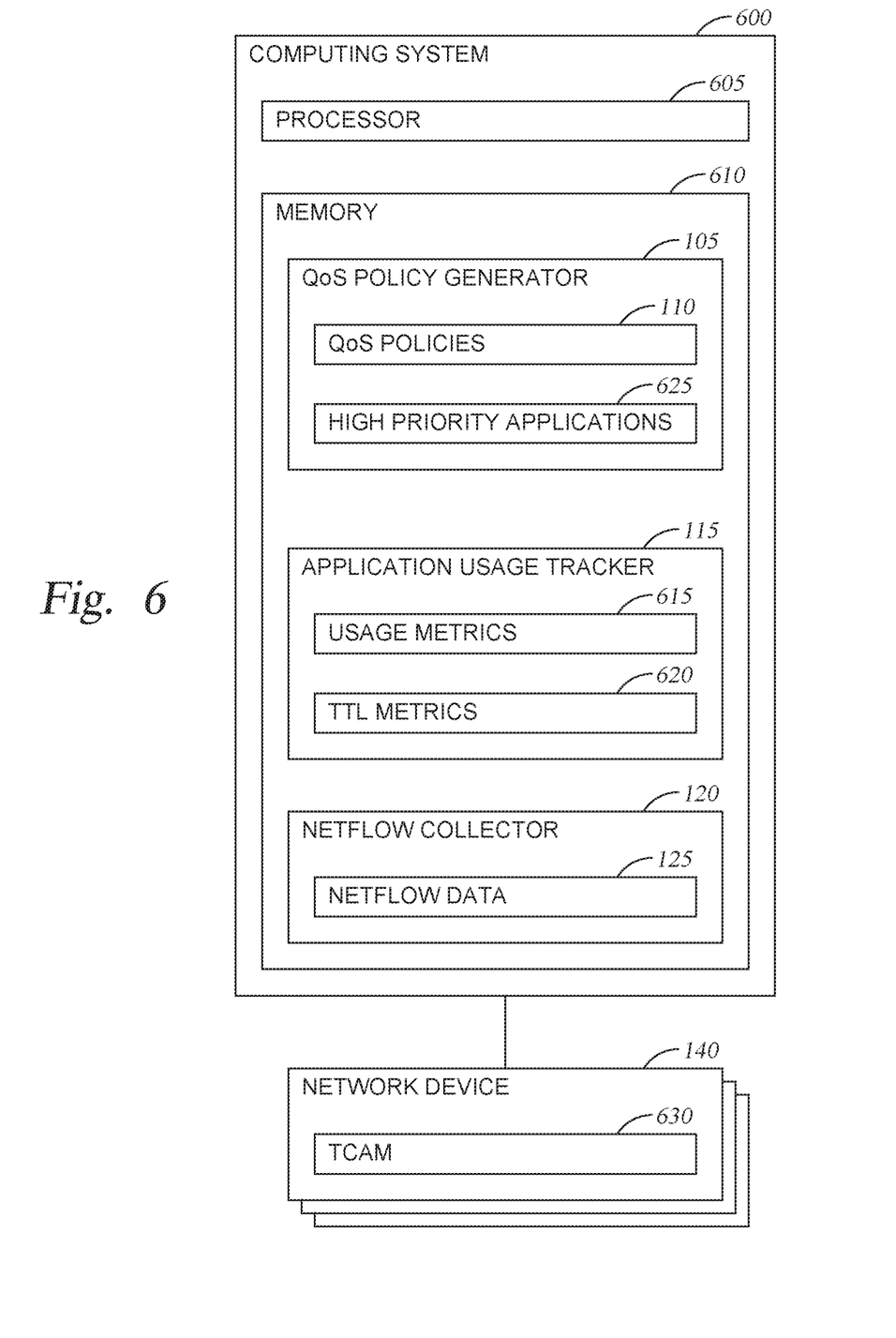
FIG. 6 is a block diagram of computing system for setting and updating QoS policies in response to application usage data, according to one embodiment.

FIG. 6 is a block diagram of computing system 600 for setting and updating QoS policies in response to application usage data, according to one embodiment. The computing system 600 includes one or more processors 605 that represent one or more processing elements that each can include one or more processing cores. In one embodiment, the computing system 600 can be a single computing device (e.g., a server) or represent multiple computing devices in communication with each other (e.g., a data center or cloud computing environment).

The computing system 600 also includes memory 610 which can include volatile and non-volatile memory elements. The memory 610 includes the QoS policy generator 105, the application usage tracker 115, and the netflow collector 120 as described above. These components can be implemented using one or more software applications.

In addition to the QoS policies 110, the QoS policy generator 105 uses a list of high priority applications 625. That is, the QoS policy generator 105 may have a list of the high priority applications 625 that can be used in the method 300 to perform an immediate update of a QoS policy when the QoS policy generator 105 identifies network traffic for one of the high priority applications 625 that was not allocated TCAM space in the network device. That is, the QoS policy generator 105 can immediately update the QoS policy 110 for that network device so the ACL or ACEs for the high priority application 625 are allocated space in the TCAM 630.

In this embodiment, the application usage tracker 115 use usage metrics 615 which are collected for each network device being monitored by the netflow collector 120. As mentioned above, the usage metrics 615 can indicate, for a predefined time period, what traffic flows (and the applications that generated those traffic flows) were in a network device. In some embodiments, the usage metrics 615 indicate the amount of data in each of those traffic flows, and can rank the traffic flows. In one embodiment, the application usage tracker 115 resets the usage metrics each time the QoS policy generator 105 updates the QoS policies 110.

The application usage tracker 115 also uses TTL metrics 620 (e.g. TTL data from an application registry) which indicate the time an application is considered to be "used" by a network device. That is, when the netflow collector 120 first detects a traffic flow for an application in a network device, or when the traffic flow for an application exceeds a minimum threshold, the TTL metrics 620 determine how long the application usage tracker 115 indicates the application is being used by the network device, even if the traffic flow stops. In one embodiment, the application usage tracker 115 resets a time period associated with the TTL metrics 620 each time network traffic for the application is detected on the network device. For example, if the TTL metric 620 for a particular application is two days, each time network traffic associated by that application is detected, the two days is reset. Thus, the network device would have to not have any traffic for that application for two days before the application usage tracker 115 determines that the application is no longer used by the network device. Alternatively, the application usage tracker 115 may maintain a current timestamp indicating when traffic from the applications was last detected on the network device and whether that timestamp is within the TTL value (e.g., within the last three day) for the application.

The computing system 600 is communicatively coupled to the network devices 140 so that the ACL/ACEs generated by the QoS policy generator 105 using the QoS policies 110 can be loaded into the TCAMs 630. While the embodiments herein describe pruning the application based on usage data due to limited space in the TCAMs 630, these embodiments are not limited to limited space in TCAMs 630 but can be used to limit the amount of space used when storing the QoS settings for applications in any type of memory in the network devices 140.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   monitoring application traffic in a plurality of network devices;
   receiving a plurality of Quality of Service (QoS) policies, each corresponding to one of the plurality of network devices, wherein each of the QoS policies comprise QoS settings for a plurality of applications, wherein a number of the QoS settings is constrained by a size of a ternary content-addressable memory (TCAM) in each of the plurality of network devices;
   identifying, based on the application traffic, which ones of the plurality of applications generated a respective traffic flow on each of the plurality of network devices during a predefined time period;
   updating each of the QoS policies to remove any settings in the QoS settings corresponding to an application of the plurality of applications that did not generate a respective traffic flow on the corresponding one of the plurality of network devices during the predefined time period; and
   transmitting the QoS settings of the updated QoS policies to be stored in the TCAMs of the plurality of network devices.

2. The method of claim 1, wherein the QoS settings comprises access control entries (ACEs) stored in the TCAMs in the plurality of network devices.

3. The method of claim 1, further comprising:
   determining that the predefined time period has expired; and
   resetting usage metrics for the plurality of network devices, wherein the usage metrics indicate which ones of the plurality of applications generated a respective traffic flow on each of the plurality of network devices.

4. The method of claim 3, further comprising:
   monitoring application traffic in the plurality of network devices for a second predefined time period;
   identifying, based on the application traffic during the second predefined time period, which ones of the plurality of applications generated a respective traffic flow on each of the plurality of network devices;
   updating each of the QoS policies to remove any of the plurality of applications that did not generate a respective traffic flow on the corresponding one of the plurality of network devices during the second predefined time period; and
   updating the QoS settings to be stored in the TCAMs of the plurality of network devices based on the updated QoS policies.

5. The method of claim 1, further comprising, after storing the QoS settings in the TCAMs of the plurality of network devices:
   identifying traffic corresponding to a first application of the plurality of applications at a first network device of the plurality of network devices;
   determining that the TCAM of the first network device does not contain QoS settings for the first application;
   determining that the first application is a high-priority application; and
   updating, on the fly, a first QoS policy of the QoS policies corresponding to the first network device to include the QoS settings for the first application.

6. The method of claim 5, wherein updating the first QoS policy on the fly comprises:
   swapping TCAM space in the first network device previously assigned to QoS settings for a second application with the QoS settings for the first application.

7. The method of claim 1, further comprising:
   receiving a time to live (TTL) metric for a first application of the plurality of applications, wherein the TTL metric indicates a time period for which the first application is considered to be used when a network traffic generated by the first application is first detected on one of the plurality of network devices, wherein the first application is not removed from a QoS policy corresponding the one of the plurality of network devices until the time period has expired.

8. The method of claim 1, further comprising:
   removing from each of the QoS policies any of the plurality of applications that did not generate a respective traffic flow over a predetermined threshold on the corresponding one of the plurality of network devices during the predefined time period.

9. A non-transitory computer readable medium having program instructions embodied therewith, the program instructions executable by a processor to perform an operation, the operation comprising:
   monitoring application traffic in a plurality of network devices;
   receiving a plurality of QoS policies, each corresponding to one of the plurality of network devices, wherein each of the QoS policies comprise QoS settings for a plurality of applications, wherein a number of the QoS settings is constrained by a size of a TCAM in each of the plurality of network devices;
   identifying, based on the application traffic, which ones of the plurality of applications generated a respective traffic flow on each of the plurality of network devices during a predefined time period;
   updating each of the QoS policies to remove any settings in the QoS settings corresponding to an application of the plurality of applications that did not generate a respective traffic flow on the corresponding one of the plurality of network devices during the predefined time period; and transmitting the QoS settings of the updated QoS policies to be stored in the TCAMs of the plurality of network devices.

10. The non-transitory computer readable medium of claim 9, wherein the QoS settings comprises ACEs stored in the TCAMs in the plurality of network devices.

11. The non-transitory computer readable medium of claim 9, wherein the operation further comprises:
determining that the predefined time period has expired; and
resetting usage metrics for the plurality of network devices, wherein the usage metrics indicate which ones of the plurality of applications generated a respective traffic flow on each of the plurality of network devices.

12. The non-transitory computer readable medium of claim 11, wherein the operation further comprises:
monitoring application traffic in the plurality of network devices for a second predefined time period;
identifying, based on the application traffic during the second predefined time period, which ones of the plurality of applications generated a respective traffic flow on each of the plurality of network devices;
updating each of the QoS policies to remove any of the plurality of applications that did not generate a respective traffic flow on the corresponding one of the plurality of network devices during the second predefined time period; and
updating the QoS settings to be stored in the TCAMs of the plurality of network devices based on the QoS policies.

13. The non-transitory computer readable medium of claim 9, wherein the operation further comprises, after storing the QoS settings in the TCAMs of the plurality of network devices:
identifying traffic corresponding to a first application of the plurality of applications at a first network device of the plurality of network devices;
determining that the TCAM of the first network device does not contain QoS settings for the first application;
determining that the first application is a high-priority application; and
updating, on the fly, a first QoS policy of the QoS policies corresponding to the first network device to include the QoS settings for the first application.

14. The non-transitory computer readable medium of claim 13, wherein updating the first QoS policy on the fly comprises:
swapping TCAM space in the first network device previously assigned to QoS settings for a second application with the QoS settings for the first application.

15. A system, comprising:
a processor; and
a memory, wherein the memory comprises an application, which when executed by the processor, performs an operation, the operation comprising:
monitoring application traffic in a plurality of network devices;
receiving a plurality of QoS policies, each corresponding to one of the plurality of network devices, wherein each of the QoS policies comprise QoS settings for a plurality of applications, wherein a number of the QoS settings is constrained by a size of a TCAM in each of the plurality of network devices;
identifying, based on the application traffic, which ones of the plurality of applications generated a respective traffic flow on each of the plurality of network devices during a predefined time period;
updating each of the QoS policies to remove any settings in the QoS settings corresponding to an application of the plurality of applications that did not generate a respective traffic flow on the corresponding one of the plurality of network devices during the predefined time period; and
transmitting the QoS settings of the updated QoS policies to be stored in the TCAMs of the plurality of network devices.

16. The system of claim 15, wherein the QoS settings comprises ACEs stored in the TCAMs in the plurality of network devices.

17. The system of claim 15, wherein the operation further comprises:
determining that the predefined time period has expired; and
resetting usage metrics for the plurality of network devices, wherein the usage metrics indicate which ones of the plurality of applications generated a respective traffic flow on each of the plurality of network devices.

18. The system of claim 17, wherein the operation further comprises:
monitoring application traffic in the plurality of network devices for a second predefined time period;
identifying, based on the application traffic during the second predefined time period, which ones of the plurality of applications generated a respective traffic flow on each of the plurality of network devices;
updating each of the QoS policies to remove any of the plurality of applications that did not generate a respective traffic flow on the corresponding one of the plurality of network devices during the second predefined time period; and
updating the QoS settings to be stored in the TCAMs of the plurality of network devices based on the QoS policies.

19. The system of claim 15, wherein the operation further comprises, after storing the QoS settings in the TCAMs of the plurality of network devices:
identifying traffic corresponding to a first application of the plurality of applications at a first network device of the plurality of network devices;
determining that the TCAM of the first network device does not contain QoS settings for the first application;
determining that the first application is a high-priority application; and
updating, on the fly, a first QoS policy of the QoS policies corresponding to the first network device to include the QoS settings for the first application.

20. The system of claim 19, wherein updating the first QoS policy on the fly comprises:
swapping TCAM space in the first network device previously assigned to QoS settings for a second application with the QoS settings for the first application.

* * * * *

UNITED STATES PATENT AND TRADEMARK OFFICE
CERTIFICATE OF CORRECTION

| | | |
|---|---|---|
| PATENT NO. | : 11,689,467 B2 | |
| APPLICATION NO. | : 16/987777 | |
| DATED | : June 27, 2023 | |
| INVENTOR(S) | : Anand Krishnamurthy et al. | |

It is certified that error appears in the above-identified patent and that said Letters Patent is hereby corrected as shown below:

On the Title Page

In item (74), in Column 2, in "Attorney Agent, or Firm", Line 1, delete "Sherdan," and insert -- Sheridan, --.

On page 2, item (56), in Column 1, under "Other Publications", Line 6, delete "Applicaton" and insert -- Application --.

In the Claims

In Column 14, Line 40, in Claim 7, after "corresponding" insert -- to --.

Signed and Sealed this
Tenth Day of October, 2023

Katherine Kelly Vidal
*Director of the United States Patent and Trademark Office*